United States Patent [19]

Akeroyd

[11] Patent Number: 4,520,766
[45] Date of Patent: Jun. 4, 1985

[54] DUAL FUEL VALVE

[76] Inventor: Richard T. Akeroyd, 3803 67th St., Lubbock, Tex. 79403

[21] Appl. No.: 616,855

[22] Filed: Jun. 4, 1984

Related U.S. Application Data

[63] Continuation-in-part of Ser. No. 378,100, May 14, 1982, Pat. No. 4,463,734.

[51] Int. Cl.³ .................... F02B 49/00; F02M 21/02
[52] U.S. Cl. .................. 123/27 GE; 123/525; 123/577; 251/324
[58] Field of Search .......... 123/525, 526, 527, 27 GE, 123/575, 576, 577; 251/324

[56] References Cited

U.S. PATENT DOCUMENTS

| | | | |
|---|---|---|---|
| 2,427,439 | 9/1947 | Brown | 251/324 |
| 2,555,818 | 6/1951 | Shirley | 123/27 GE |
| 2,555,884 | 7/1951 | Steven et al. | 123/27 GE |
| 2,613,055 | 10/1952 | Slapnicher | 251/324 |
| 2,739,577 | 4/1956 | Moulton | 123/27 GE |
| 2,781,752 | 2/1957 | Van Den Bussche | 123/527 |
| 2,908,258 | 10/1959 | Schowalter et al. | 123/27 GE |
| 3,646,924 | 3/1972 | Newkirk et al. | 123/527 |
| 3,698,365 | 10/1972 | Hallberg | 123/27 GE |
| 3,753,424 | 8/1973 | Haidvogel | 123/525 |
| 4,425,898 | 1/1984 | Mclean | 123/527 |

Primary Examiner—E. Rollins Cross
Attorney, Agent, or Firm—Wendell Coffee

[57] ABSTRACT

A diesel engine is designed to burn on a mixture of liquid fuel or diesel, and liquefied petroleum gas, or gas. The diesel is injected into the cylinders as is conventional on diesel engines. The gas is mixed into the intake air. The output of the governor connects to a diesel control and a gas control. As more fuel is consumed, both the amount to diesel and the amount of gas is increased; however, the amount of diesel is increased. At no load, the engine operates on about 76 percent diesel and 24 percent gas. At 100 percent load, the engine operates on about 80 percent gas and 20 percent diesel. A special gas valve includes a sleeve in a cylinder with an axially moveable plug. The sleeve may be rotated in the cylinder so that the inlet and outlet ports are changed.

6 Claims, 17 Drawing Figures

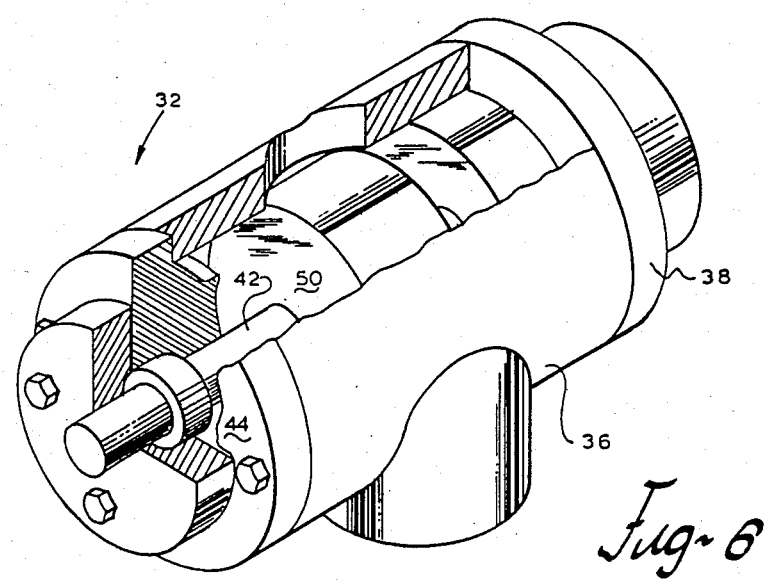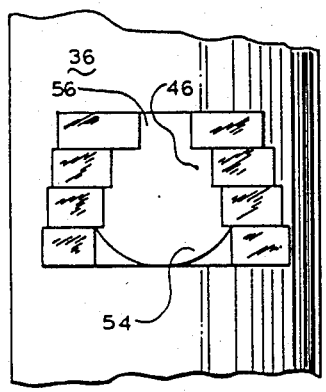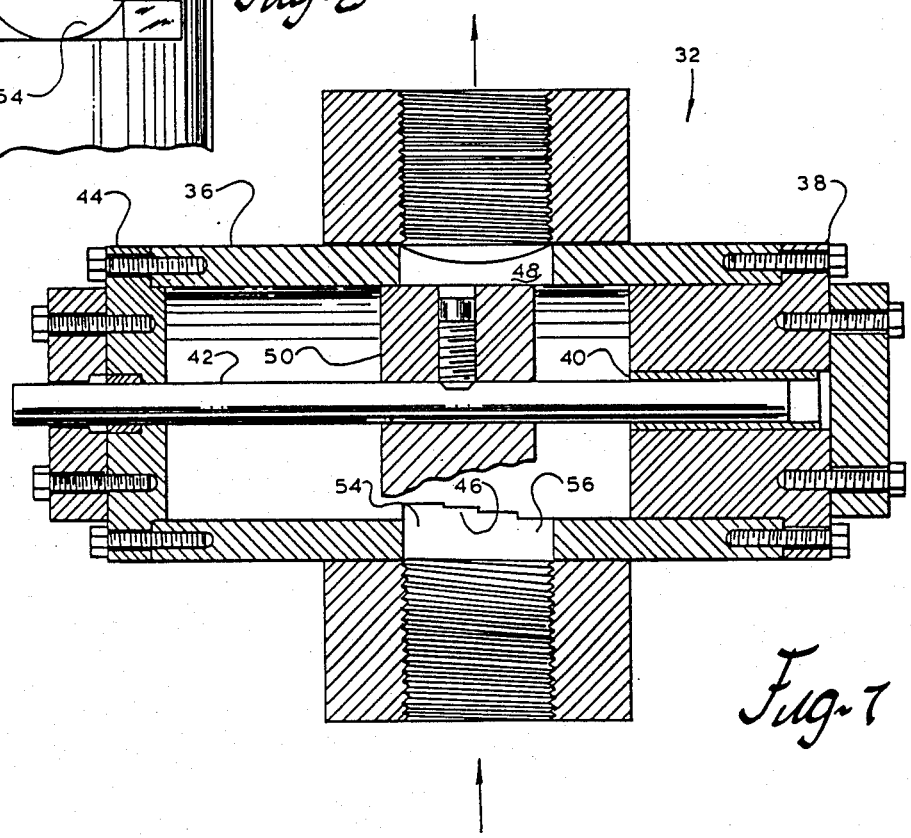

DUAL FUEL VALVE

CROSS REFERENCE TO RELATED APPLICATIONS

This is a continuation-in-part of my U.S. patent application Ser. No. 378,100, filed May 14, 1982, issued Aug. 7, 1984, as U.S. Pat. No. 4,463,734.

BACKGROUND OF THE INVENTION (1) Field of the Invention

This invention relates to internal combustion engines and more particularly to compression ignition engines which use both liquid and gas fuels. (123/27GE)

(2) Description of the Prior Art

At the present time, there is on the market commercially, engines running on a combination of either natural gas or liquefied petroleum gas, and a liquid fuel herein called diesel. These engines were basically converted liquid engines having a regular liquid fuel injection system where the amount of fuel to be injected is controlled by the output of a governor. However, the amount of gas to be included as a fuel is primarily controlled by the amount of intake air through an air venturi system, similar to a spark ignition engine carburetor.

Before the original application was filed, the applicant caused a search to be made in the U.S. Patent and trademark Office. The following references were found in the U.S. Patent and Trademark Office and were reported by the searcher:

SHIRLEY, U.S. Pat. No. 2,555,818
NICHOLS, U.S. Pat. No. 2,681,049
DAVIDS, U.S. Pat. No. 2,708,916
STEIGER, U.S. Pat. No. 3,406,666
LAUBACH, U.S. Pat. No. 3,443,551
FOX, U.S. Pat. No. 3,540,419
HALBERG, U.S. Pat. No. 3,698,365

Of these patents HALBERG, NICHOLS, DAVIDS, SHIRLEY, and LAUBACH appear to increase the amount of diesel as well as increase the amount of gas as the total fuel is increased. FOX and STEIGER do not appear to operate upon this principle.

HALBERG uses a notched rod on the gas valve. DAVIDS uses a butterfly valve on the gas valve. SHIRLEY appears to increase the amount of gas by the length of time a gas poppet valve remains open. NICHOLS appears to use a manual control valve to adjust the amount of each fuel being used. LAUBACH discloses a valve having a piston with a series of drill holes in the valve cylinder wall.

In the prosecution of the original application, the Examiner cited:

RATHBUN, U.S. Pat. No. 2,502,990
SHIRLEY, U.S. Pat. No. 2,555,818
HAIDVOGEL, U.S. Pat. No. 3,753,424

SUMMARY OF THE INVENTION (1) New and Different Function

I have invented an engine to operate on diesel and gas. Using engines produced to operate upon diesel only, the most economical conversion is to mix the gas into the incoming air. I have discovered that there is always a certain minimum amount of diesel necessary for good operation of the engine if the gas is mixed with the incoming air. I have discovered that at very low load situations, i.e. where a very low rate of fuel is being used, it is best to use about three times as much diesel as gas. As additional fuel is fed to the engine, it is desirable to increase the amount of gas so that at full load about three times as much gas is used a diesel.

As used herein, full load is used as a designation of a maximum load at which the engine will operate economically and satisfactorily on a continuous basis. It will be understood by those having skill in the art that this "full load", or "100 percent load" as sometimes used herein, is not the maximum horsepower which can be produced by the diesel engine, nor is it the point where the greatest fuel efficiency is obtained by the engine. I.e., if economy of fuel cost were to be considered only, the engine could be run at a much higher load than what is called in this application 100 percent load. For economic operation, the life of the engine as it is related to the wear and tear on the engine must be considered along with the fuel cost.

Also, when discussing the amount of fuel used generally the application will be on the basis of the BTU's supplied by that fuel. I.e., when the term is used that 80 percent of the total fuel is diesel that means that 80 percent of the total BTU's furnished the engine is from the diesel fuel and that 20 percent of the total BTU's will be from the gas fuel. It is recognized that diesel fuel will have about 19,740 BTU per pound while the gas fuel will have about 22,300 BTU per pound. For purposes of analysis and comparison, the ratio of the fuels used will be according to their BTU content. E.g., when the term is used, the gas to diesel ratio is about three to one, it is meant that about three times as much BTU is obtained from the gas fuel as from the diesel fuel.

I have discovered that best operation is obtained by providing at no load the mixture of fuel which is at least 75 percent diesel. As the load increases it is undesirable to increase the amount of gas fuel and diesel fuel in direct relationship to the increase in load. However, I found it desirable to increase the gas fuel about 16 times faster than the diesel fuel. I.e., for each additional diesel BTU there will be an increase of 16 gas BTU's.

I achieve this particular ratio by the particular design of the gas valve that is used as explained more fully hereafter.

In addition, I have found that it is highly desirable that the gas be well-mixed with the air. This is done by a particular ring arrangement to introduce the gas into the air.

(2) Objects of this Invention

An object of this invention is to operate a diesel engine on a combination of diesel and gas fuel.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawing.

BRIEF DESCRIPTION OF THE DRAWINGS

FIG. 6 is a perspective view of a first metering valve with parts broken away to show the construction.

FIG. 7 is an axial section of the metering valve.

FIG. 8 is a partial, elevational view of the inlet port of the metering valve.

DESCRIPTION OF THE PREFERRED EMBODIMENT

Figure 1:
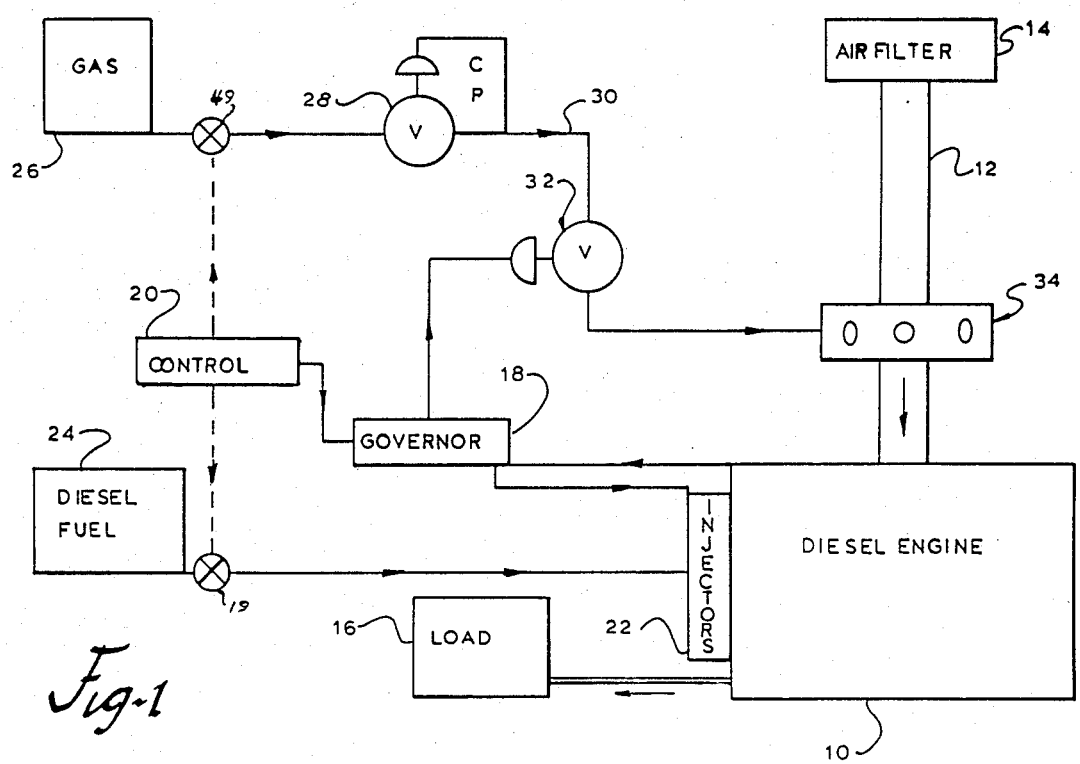
FIG. 1 is a schematic representation of a diesel engine using gas and diesel fuel according to my invention.

Referring to the drawings and particularly to FIG. 1, there may be seen a schematic diagram of a diesel engine according to this invention. The engine 10 will have associated with it air intake 12, which has air filter 14 thereon.

The engine 10 is connected by a output shaft to load 16. The engine 10 will drive governor 18, which has control 20. Those skilled in the art will understand that the control 20 might take various forms. For example, if the engine is to be used upon a truck, the control will take the form of a pedal, therefore, for greater speed of the engine, the driver depresses the pedal. In other situations, if the load 16 is an air compressor, the control 20 might be a pressure responsive device, so if the air pressure is an accumulator connected to the pressure decreased, the control would increase the speed of the engine 10. Another situation is the control would be a normal speed setting, i.e., the engine might be set to operate at some given speed, for example 1,800 rpm and this speed would not be changed except in special situations such as to reduce it to an idle speed.

The output of the governor 18 will control the injectors 22 which are pump-like devices by which the liquid diesel fuel is injected into the cylinders of the engine 10. Of course, the liquid diesel fuel (herein called diesel) is stored in fuel tank 24 to be supplied to the injectors 22.

Also the particular block in the drawings labeled control 20 might be more than one control, i.e., there is also illustrated a shutoff valve 19 in the fuel line from the fuel tank 24 to the injectors 22. This shutoff valve might be closed by a different and separate control than the specific control discussed above.

Those having skill in the art will understand that the equipment described to this point is conventional, and in general what is found on most diesel engines.

For purposes of my invention, gas vessel or gas supply line 26 is attached thereto. As explained above and used herein, gas usually refers to liquefied petroleum gas under considerable pressure. Therefore, for normal use, pressure regulator valve 28 will be used so that in gas line 30 going to metering valve 32, will operate at constant pressure. I.e., that regulator valve 28 furnishes gas under a constant pressure to the metering valve 32.

The metering valve 32 is controlled by the output of the governor 18. The arm from the governor which is connected to the injector 22 is internally connected to the operator for the metering valve 32. The output of the gas from the metering valve 32 is fed through plenum ring 34 with the inlet air to the engine. Therefore it may be seen that if the metering valve 32 is such that it increases the amount of gas furnished to the engine as the load of the engine is increased that the objectives of this invention will be achieved.

First valve design is shown in FIGS. 6, 7, and 8.

The first valve includes cylindrical housing 36, which has closed base 38. The base is held upon the cylindrical housing by a plurality of cap screws extending through holes in the base 38 and threaded into the end of the cylindrical housing 36. Shaft guide 40 is telescoped into the housing adjacent to the closed base 38 to guide the shaft 42. The shaft 42 enters the cylindrical housing 36 through top cap 44 having a bushing and seal around an axial opening. The top cap 44 is attached to the cylindrical housing 36 by cap screws the same as the closed base 38.

The housing has a circular outlet port 48 opening diametrically into the housing, and diametrically opposed to the outlet port 48 is inlet port 46 of special shape described hereafter. Valve plunger or plug 50 is securely attached to the shaft 42 by a set screw. Thus the shaft 42 forms means for moving the plug 50. The plug forms a snug fit with the cylindrical housing 36. It may be seen that if the plug valve 50 is in the closed position that the plug valve will cover both the inlet and outlet ports 46 and 48. However as the plug 50 is raised, it will expose portions of both the inlet port 46 and the outlet port 48. Even if both ports are closed, there will be a certain flow, or seepage, or leakage, of gas around the plug valve so that there will be a certain minimum flow of gas even in the "closed" position.

A gas shutoff valve 49 is connected between the gas source 26 and the regulator valve 28. The control for this valve is also shown to be control 20, although those having skill in the art will understand that it might be a different and separate control from all of those discussed above.

The control to the injectors 22 is basically linear i.e., for each increment of movement of the control from the governor 18 that an additional increment of diesel will be supplied or injected by injectors 22 into the engine 10. It is desirable, according to my invention, that the amount of gas be linearly responsive. For each increment of movement of the control a fixed increment of gas be supplied. As stated before, when I speak of an increment of fuel, either liquid, or gas it is desirable that we speak in terms of the BTU content, which, of course, would be directly proportional to the weight of the fuel either liquid or gas.

To achieve the linear increase of gas, I use a specially shaped inlet port 46. Inlet port 46 will be formed of a series of slot openings. The last opened slot 54 is the widest. Referring to FIG. 8, it may be seen that the series of openings are somewhat of pyramid or triangular shape. I.e., the last open slot 54 is the widest and that each previous slot is narrower. The first slot 56 is the most narrow of the group. The distance form the edge of the last slot 54 to the edge of the first slot 56 is the same as the diameter of the circular outlet port 48. I have found, that with a valve designed such as this, the desired ratio of fuels is obtained to the engine.

The desired fuel ratios are shown by the several curves on the diagrams or graphs of FIGS. 2-5. There it may be seen that the different curves or lines relating to the gas and diesel fuel are plotted against the load. As stated before, what is shown on the graphs as 100 percent load is the maximum continuous operation load and not necessarily what the engine will produce.

Figure 2:
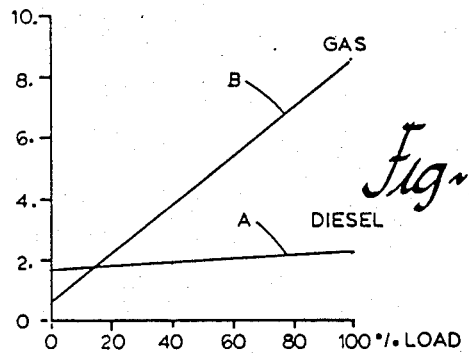
FIG. 2 is a diagram showing the amount of BTU's furnished from the gas and from the diesel for different loads, with the scale being that 100 percent load is equal to one horsepower.
Figure 3:
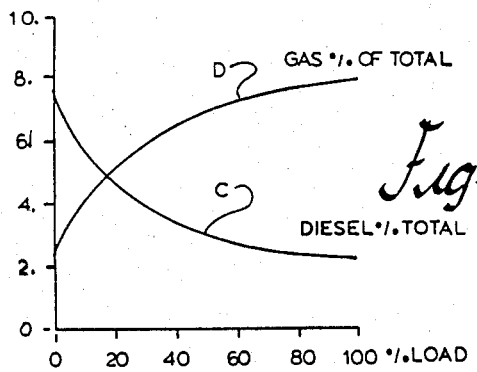
FIG. 3 is a diagram showing the percent gas and the percent diesel in the total fuel from no load to full load.
Figure 4:
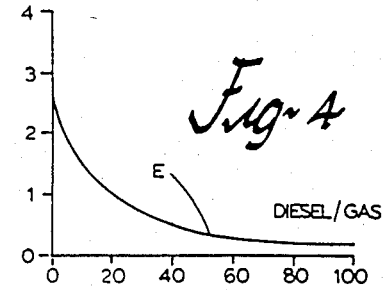
FIG. 4 is a diagram showing the ratio of the amount of diesel to gas from no load to full load.
Figure 5:
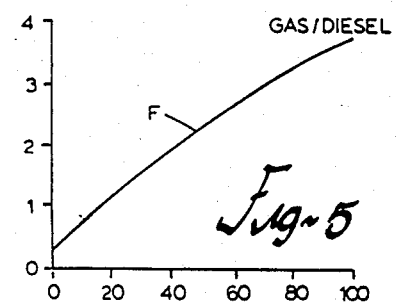
FIG. 5 is a diagram showing the ratio of the amount of the gas to diesel furnished from no load to full load.
Figure 9:
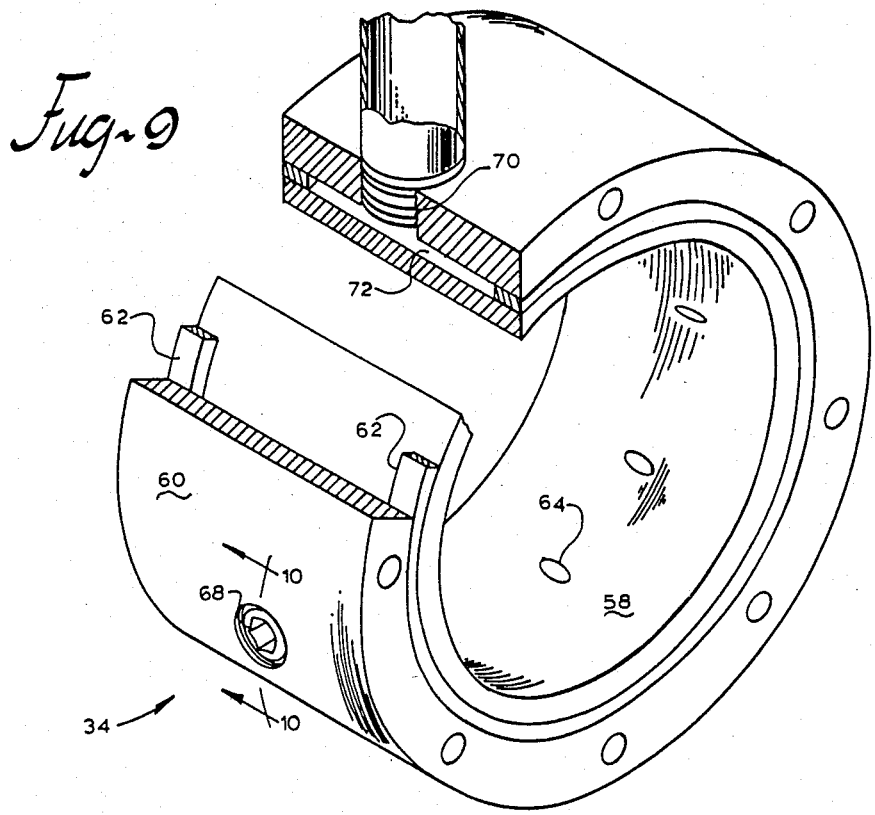
FIG. 9 is a perspective view of the plenum ring broken away to show construction.
Figure 10:
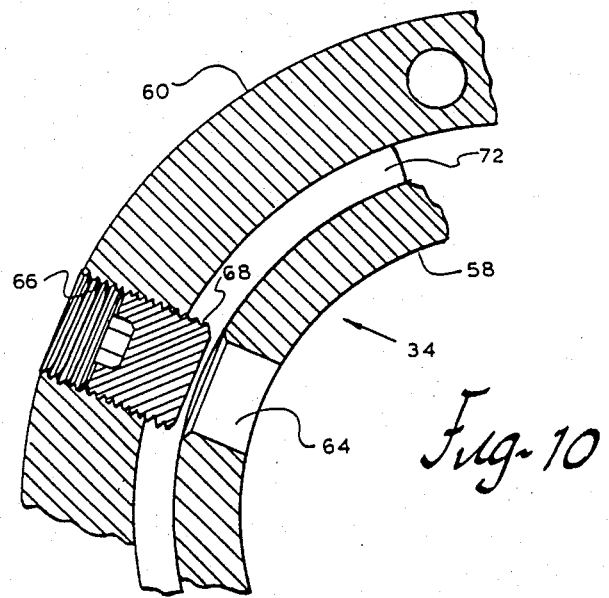
FIG. 10 is a partial sectional view of the plenum ring taken substantially on line 10—10 of FIG. 9.
Figure 11:
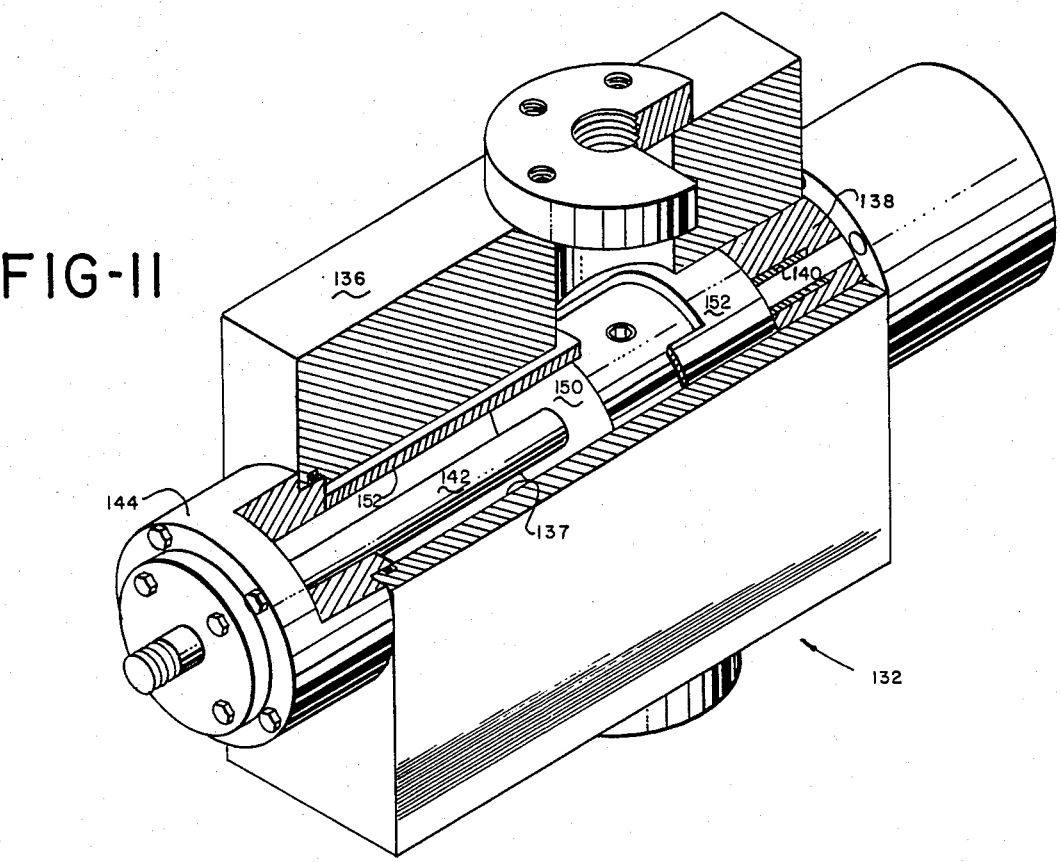
FIG. 11 is a perspective view of a second embodiment of the metering valve with parts broken away to show the construction.
Figure 12:
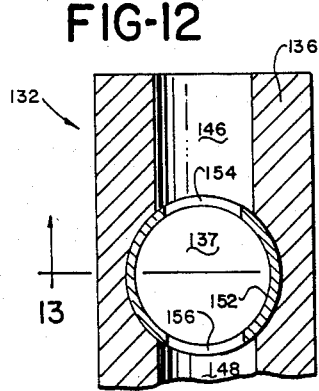
FIGS. 12, 14, and 16 are cross sectional views of the second embodiment showing the sleeve in different positions.
Figure 14:
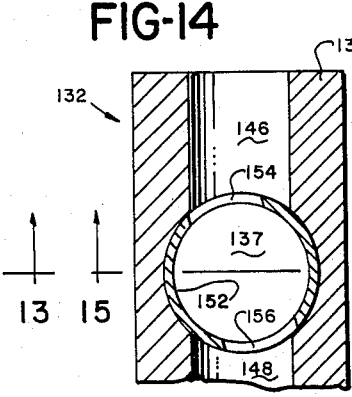
Figure 16:
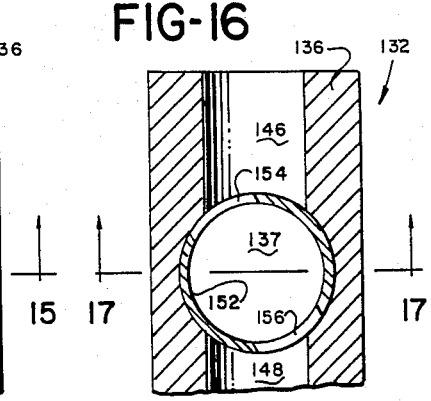
Figure 13:
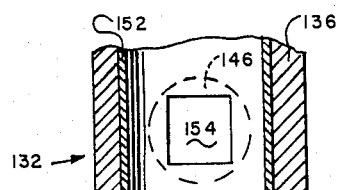
FIGS. 13, 15, and 17 are axial sectional views of the second embodiment taken on lines 13—13, 15—15 and 17—17 of FIGS. 12, 14, and 16 respectively.
Figure 15:
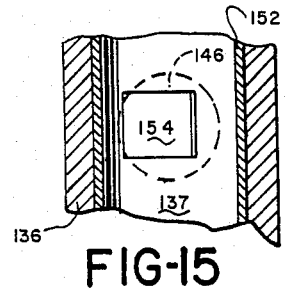
Figure 17:
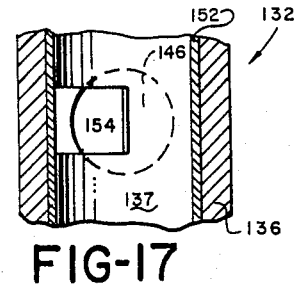

Also, 100 percent or full load on the FIG. 2 relates to one horsepower. I.e., that the amount of BTU of gas and diesel fuel is shown at what would be consumed at per horsepower when 100 percent of the load is related to one horsepower. Also, the exact figures for FIG. 2 are also related to an operating speed of 1,800 rpm. It will be recognized, however, that basically the amount of fuel will be more related to the percent load or full load than it will be to engine speed.

First, line A shows the amount of diesel consumed by the engine according to my invention for different loads from 0 to 100 percent load. It may be seen that it increases only slightly from about 1,630 BTU to about 2,200 BTU from 0 to 100 percent load. The increase of diesel fuel will basically be linear, thus line A is a straight line and shows that for each increase in increment in load, there will be a proportional increase in fuel consumption.

Line B shows that the gas will increase in a straight line. It will increase from no load supply of about 500 BTU to a full load supply of 8,500 BTU. It may be seen that the amount of gas is considerably less than the amount of diesel at no load, but still that the amount of gas increases proportional to the load. The gas increases about 14 times faster than the diesel increases as the load increases.

This relationship, perhaps, is well shown in lines C and D which show the percent of diesel to the total amount of fuel and also the percent of gas to the total amount of fuel. Line C shows the percent of the diesel to the total amount of fuel. At no load about 76 percent of the fuel is being supplied by the diesel, but as the load increases, the percent of diesel drops rapidly so that at 60 percent load that only about 27 percent of the total fuel is being supplied by the diesel. The percentage of diesel supplied decreases approaching about 20 percent as the load increases to 100.

Line D shows the percentage of gas. The percent of gas at no load is small, being only about 24 percent of the total amount of fuel being supplied, but this increases rapidly so that at 60 percent load, it's about 73 percent of the total amount of fuel is supplied by the gas. The percentage of gas increases rather slowly so that the amount of fuel supplied by the gas approaches about 80 percent at full load.

Perhaps the relationships show more dramatically by line E, which shows the ratio of the amount of diesel to the amount of gas. At no load the diesel/gas ratio is over three to one. There are more than 3 BTU's furnished by the diesel for every BTU furnished by the gas. This diesel/gas ratio drops very rapidly, so that at 40 percent load that it's about 0.5, which is to say that for every 5 BTU's furnished by the diesel that 10 BTU's are being furnished by the gas. The diesel/gas ratio continues to decrease slowly approaching a figure of about 0.25 meaning that for every BTU furnished by the diesel, that 4 BTU's are being furnished by the gas at full load.

The final line, line F, shows ratio of the gas to diesel. There again, this shows to be basically a straight line, i.e., as the load increases, the ratio of the BTU's furnished the gas to the diesel increases. The gas/diesel ratio is proportional to the load. Technically or theoretically this is not exactly a straight line, but for the purposes of this invention, it is well approximated by a straight line. I.e., at no load there will be about a little over 3 BTU's furnished from the gas for every 10 BTU's furnished by the diesel, but this will increase, so that at full load, there is nearly 4 BTU's furnished by the gas for every BTU furnished by the diesel.

As stated above, after being metered by the metering valve 32, the gas is mixed with the incoming air through plenum ring 34. The plenum ring is placed within the air intake 12 immediately downstream from the air filter 14. The plenum ring 34 includes an inside cuff or collar 58 and an outside cuff or collar 60. The two collars are held apart by spacer rings 62. As illustrated the inside ring has seven outlet jets 64 from it. Six of the spaces between the seven jets are 45 degrees and the other space is 90 degrees. The spacer rings 62 form a gas-tight seal between the two collars 58 and 60. As illustrated, the outside collar 60 has seven diametrical holes 66 therethrough. The seven diametrical holes 66 are aligned with the seven outlet jets 64 within the inside collar 58. Each of the seven holes 66 are tapped to receive metering plug 68. Each of the metering plugs will extend to about the surface of the inside collar 58. Therefore, the flow rate through each of the holes can be adjusted by the metering plug 68. In the outside collar 60, the eighth hole 70 is the inlet hole into the plenum 72 between the inside and outside collars 58 and 60. The inlet gas is fed to the plenum ring 34 from the metering valve 32.

I have found that having a flow restriction at each of the outlet jets 64 is advantageous and results in good or better mixing of the gas and the air before entering each of the cylinders of the engine.

A second valve 132 is shown in FIGS. 11 through 17. The second valve includes a housing 136 having a cylindrical bore 137 therethrough. A cross section of the housing 136 is rectangular. By cross section it is meant a section taken at right angles to the axis of the bore 137. Closed base 138 closes the bore at one end. The base is held to the housing 136 by plurality of cap screws extending through holes in the base 138 and threaded into tapped holes in the housing 136. Shaft guide 140 is telescoped into the housing to guide shaft 142. The shaft enters the bore 137 and is coaxial therewith through top cap 140 which is attached to the housing 144, similar to the base 138.

A cylindrical bore extends through the housing 136 at a right angle to the bore 137. This bore is of smaller diameter than bore 137. As the bore extends through one side wall of the housing 136, it forms the inlet cylinder port 146. On the other side, this smaller diameter bore forms the outlet cylinder port 148.

Sleeve 152 is telescoped snugly within the bore 137. Although it is telescoped snugly within the bore, it still can be rotated by hand within the bore. Inlet sleeve port 154 extends through the sleeve at the inlet cylinder port 146. Outlet sleeve port 156 extends through the sleeve 152 at the outlet cylinder port 148.

Valve plunger or plug 150 is securely attached to the shaft 142 by a set screw. The plug forms a snug fit within the sleeve 152. However, it is readily reciprocated within the sleeve. It may be seen that if the plug valve 150 is in the closed position that the plug valve will cover both the inlet sleeve port 154 and the outlet sleeve port 156. However, as the plug 150 is raised, it will expose portions of both the inlet sleeve port 154 and the outlet sleeve port 156. As before, even if both ports are closed, there will be a certain flow or seepage or leakage of gas around the plug 150 so that there will be a certain minimum flow of gas even in the "closed" position.

Basically, the second valve 132 operates as the first valve 32. However, it can readily be seen that if in the fuel records indicate to the operator that it is desirable to have a change in the gas/diesel ratio that it may be accomplished. Specifically, the operator may remove the base 138 by removing the screws and the sleeve 152 may be rotated to reduce or enlarge the effective inlet and outlet ports. I.e., after the sleeve is rotated so that the center of the housing or cylinder ports 146 and 148 is not exactly the same as the center of the sleeve ports 154 and 156, obviously, there will be a throttling or a reduced flow of gas. (See FIG. 17.) Exact alignment, of course, will result in the maximum flow of gas (See FIG. 13.)

Also, the valve 132 presents the opportunity to the operator to individualize the particular curves or characteristics of the gas/diesel ratio. Specifically, I prefer to use a bore diameter through the sleeve 152 of about 1.50". I.e., the plug 150 will have a diameter of about 1.494". Also, I prefer to use an inlet diameter (cylinder port 146) of about 1.50". I prefer to use a hole (sleeve port 154) through the sleeve 152 which projects as a 1" square hole. However, it will be readily apparent that the sleeve holes or ports could be rectangular, triangular, circular, or diamond shaped. Therefore, if any particular operator of the engine desires to produce particular characteristics of the gas/ diesel ratio, analysis will show that he could achieve different characteristics.

This is also important inasmuch as although up to this point is has been spoken of the gas being a liquefied petroleum gas such as propane or butane. It will also be understood that the gas could be methane or "natural gas". Also, those skilled in the art will recognize that "natural gas" is not pure methane but contains many other gases therein, and therefore, has widely varying energy characteristics. The methane inherently has less heating value than butane and propane, which also are different. Since the shapes of the sleeve ports are almost endless, there has been no attempt to show any of the various shapes except the square shape.

It will be understood that after adjustment of the sleeve to th desired rotational position that the reattachment of the base 138 will fix the sleeve in the rotational position. Therefore, it may be seen that in this particular instance, the base forms a means for fixing the sleeve in any rotated position.

Thus, it may be seen that I have achieved the objective of providing an engine operating on two fuels, liquid or diesel fuel and a liquefied petroleum gas or gas fuel.

Also, analysis will show another advantage is that if gas fuel is not available for some reason, the engine will operate normally on diesel fuel. I.e., if the gas supply from vessel 26 is exhausted, the governor will automatically increase the total amount of fuel to be used so that the diesel fuel furnishes the amount of fuel to meet the load as required by the control 20.

The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defining in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | | | |
|---|---|---|---|
| 10 | engine | 50 | valve plug |
| 12 | air intake | 58 | inside collar |
| 14 | air filter | 60 | outside collar |
| 16 | load | 62 | spacer rings |
| 18 | governor | 64 | outlet jets |
| 19 | diesel cutoff valve | 66 | diametrical holes |
| 20 | control | 68 | metering plug |
| 22 | injectors | 70 | inlet hole |
| 24 | fuel tank | 72 | plenum |
| 26 | gas vessel | 132 | valve |
| 28 | regulator valve | 136 | housing |
| 30 | gas line | 137 | bore |
| 32 | metering valve | 138 | base |
| 34 | plenum ring | 140 | guide |
| 36 | cylindrical housing | 142 | shaft |
| 38 | closed base | 144 | top cap |
| 40 | shaft guide | 146 | inlet cylinder port |
| 42 | shaft | 148 | outlet cylinder port |
| 44 | top cap | 150 | plug |
| 46 | inlet port | 152 | sleeve |
| 48 | outlet port | 154 | inlet sleeve port |
| 49 | gas shutoff valve | 156 | outlet sleeve port |

I claim as my invention:
1. On a diesel engine
   a. having an inlet air conduit,
   b. a governor on the engine,
   c. an output rod from the governor,
   d. said output rod controlling liquid injectors on the engine, wherein the improvement comprises in combination:
   e. a gas metering valve including a cylinder,
   f. a plug in the cylinder, said plug connected to the output rod, so that
   g. means connected to said plug for moving said plug axially in the cylinder responsive to the movement of the output rod of the governor,
   h. an inlet cylinder port into said cylinder,
   i. said inlet port entirely closed by said plug when the load of the engine is very small as reflected by the position of the governor output rod,
   j. an outlet cylinder port entirely closed by said plug when the load of the engine is very small,
   l. said inlet and outlet ports shaped so that gas flow through the metering valve is proportional to the movement of the plug,
   m. said inlet port connected to a source of gas fuel, and
   n. the outlet port connected to the air inlet conduit.

2. The invention as defined in claim 1 further including:
   o. a cylindrical sleeve rotatable mounted in said cylinder,
   p. means on the cylinder for fixing the sleeve in any rotated position,
   q. said plug in said sleeve,
   r. an inlet sleeve port in the sleeve at the inlet cylinder port,
   s. an outlet sleeve port in the sleeve at the outlet cylinder port
   t. so that rotation of the sleeve changes the effective shape of the inlet and outlet ports.

3. The invention as defined in claim 1 further including:
   o. the last portion of the inlet port opened being wider than the first portion of the inlet port opened, and
   p. the outlet port being circular.

4. The invention as defined in claim 1 further including:
   o. the output of the metering valve being fed to a plenum ring mounted on the intake air conduit,
   p. said plenum ring having plurality of outlet jets entering into the inlet air conduit to the engine,
   q. the inside diameter of the plenum ring being the same as the inside diameter of the intake air conduit,
   r. each of the jets having a metering plug within a plenum,
   s. said plenum being formed within the plenum ring between an inside collar and an outside collar which are sealed together at the top and bottom by a spacer ring, and
   t. said metering plug being threaded into tapped holes in the outside collar.

5. The invention as defined in claim 4 further including:
   u. a cylindrical sleeve rotatable mounted in said cylinder,
   v. means on the cylinder for fixing the sleeve in any rotated position,
   w. said plug in said sleeve,
   x. an inlet sleeve port in the sleeve at the inlet cylinder port,
   y. an outlet sleeve port in the sleeve at the outlet cylinder port,
   z. so that rotation of the sleeve changes the effective shape of the inlet and outlet ports.

6. On a diesel enging having
   a. an inlet air conduit,
   b. a source of gas fuel,
   c. a metering valve connected to the source of gas fuel,
   d. a plenum ring mounted on the intake air conduit,
   e. the output of the metering valve being fed to the plenum ring, and
   f. the inside diameter of the plenum ring being the same as the inside diameter of the intake air conduit, wherein the improvement comprises in combination:
   g. said plenum ring being formed by:
      i. an inside collar,
      ii. an outside collar,
      iii. a top spacer ring sealing the inside and outside collar,
      iv. a bottom spacer ring sealing the inside and outside collar,
   h. a plurality of outlet jets through the inside collar wherein gaseous fuel inside the plenum is fed into the inlet air conduit to the engine, and
   j. a metering plug for each outlet jet,
   k. each metering plug threaded into a tapped hole in the outside collar and each metering plug extending to about the surface of the inside collar.

* * * * *